April 8, 1958 G. E. KELLY 2,830,115

COLOR TELEVISION

Filed Feb. 5, 1954 2 Sheets-Sheet 1

INVENTOR.
GORDON E. KELLY
BY [signature]
ATTORNEY

April 8, 1958 G. E. KELLY 2,830,115

COLOR TELEVISION

Filed Feb. 5, 1954 2 Sheets-Sheet 2

INVENTOR.
GORDON E. KELLY
BY [signature]
ATTORNEY

United States Patent Office 2,830,115

Patented Apr. 8, 1958

2,830,115

COLOR TELEVISION

Gordon E. Kelly, Haddonfield, N. J., assignor to Radio Corporation of America, a corporation of Delaware Application February 5, 1954, Serial No. 408,553

7 Claims. (Cl. 178—69.5)

The present invention relates to keying circuits and more particularly to improved keying circuits of the type employed in color television receivers.

Color television is the reproduction on the viewing screen of a receiver of not only the relative luminance or brightness, but also the color hues and saturations of the details in the original scene. The electrical transfer of images in color may be accomplished by additive methods. Additive methods produce natural color images by breaking down the light from an object into a predetermined number of selected primary or component colors. Color images may then be transferred electrically by analyzing the light from an object into not only image elements, as is accomplished by normal scanning procedure, but by analyzing the light from elemental areas of the image into selected primary or component colors, and thereby deriving a signal representative of each of the selected component colors. A color image may then be reproduced at a remote point by appropriate reconstruction from a component color signal chain.

Complete synchronism between the transmitter and receiver is essential in the successful operation of television equipment. As a result, much emphasis is placed on the development and utilization of synchronizing methods. This is particularly true in color television wherein not only is it necessary to maintain accurate deflection scanning but it is also necessary to maintain accurate synchronism in the timing of component color selection.

The need for such accurate synchronism is illustrated in the following discussion of the fundamental elements of the modern color television receiver which transmits signals conforming to NTSC standards which have been approved by the Federal Communications Commission on December 17, 1953. A complete discussion of such standards is included in the article entitled "NTSC color television standards" by Donald Fink, starting on page 138 of "Electronics" for December 1953.

A modern color television signal consists basically of two different types of signals, one is referred to as the luminance signal and the other is called the chrominance signal or chroma. The luminance signal is basically the monochrome signal. It is not necessary that the monochrome signal be produced by a standard monochrome camera. In fact, if the three primaries are mixed together in the right proportion, it is possible to produce a white matching typical daylight which itself can be utilized to reproduce or describe various tones of gray. This mixture of primary colors has been found to be dependent upon the fact that the green primary accounts for 59% of the brightness sensation while the red and blue primaries account for only 30% and 11% respectively. Therefore it is possible to produce the luminance signal adding electrically the signals from the red, green and blue camera tubes to produce a monochrome signal equal to .30R+.59G+.11B. In actual practice, the camera signals are deliberately made nonlinear to compensate for the nonlinearity of the kinescopes used in the receiver, but the luminance signal as thereby derived is still a good approximation of the output of a black-and-white image signal camera.

Accompanying the luminance information is the chrominance information. In television transmission the red, green, and blue information is actually not transmitted in the form relating directly to the primary colors. Rather, color difference signals are formed; these color difference signals are denoted R–Y, G–Y, and B–Y, where Y is the luminance signal. When considered in combination, these color difference signals indicate how each color in the televised scene differs from a monochrome color of the same luminance. A superficial investigation of the color television system thus far would seem to indicate that a total of four signals would be required for a color television system. However, since the color difference signals are not independent, it is always possible to solve for a third signal when any two of them are known. This then requires suitable matrix systems to be included in either the television transmitter or receiver to form the proper combination of color difference signals or to recover the color difference signals to conform with the transmitted picture.

The transmission of two-color difference signals would possibly imply the use of two subcarriers for the transmission of these signals. In the modern color television system, however, it is not desirable to use two separate frequency interlaced carriers because the difference in frequency between them would be an even multiple of one-half the frame frequency and hence, as can be shown, interference cannot be caused to be self-cancelling between adjacent lines and also the difference frequency would be produced as a beat between two carriers whenever the signal is passed through a nonlinear device such as a kinescope. The need for two carrier frequencies for transmitting the two signal color difference information then can be eliminated by the use of, for example, the two-phase modulation technique which is equivalent to the use of two carriers of the same freqeuncy but with a phase separation of 90° The carrier frequency employed is approximately 3.58 mc. Two independent signals are thereby modulated upon two carriers having this frequency but 90° apart in phase. The outputs of the two modulators feed a common transmission channel; i. e., the two modulated waves are simply added together. The two independent components are separated at the receiving end by two additional demodulators operating as synchronous detectors, which beat the incoming signal by two carriers having the same relative phases as the carriers at the transmitter. The carriers at the receiver must be supplied by an oscillator which is maintained in frequency and phase synchronism with the master oscillator at the transmitter; some form of special synchronizing information must therefore be included with the transmitted signal for this purpose.

The two-phase modulation technique is basically a means for using the two sidebands surrounding a single carrier frequency for the transmission of two variables. It is common knowledge among radio engineers that double sideband transmission is ordinarily wasteful of spectrum space. Since the information contained in the two sidebands is identical whereas an ordinary amplitude-modulated wave bears only amplitude, the signal transmitted by two-phase transmission systems varies in both amplitude and phase.

The most serious disadvantage of the two-phase technique is the need for carrier reinsertion at the receiver. This disadvantage makes the technique economically undesirable in many applications but its use in color television systems is entirely feasible because time is available during the blanking intervals for the transmission of carrier synchronizing information. Under the NTSC signal specifications, the subcarrier synchronizing information consists of bursts of at least 8 cycles of the subcarrier frequency at a predetermined phase, transmitted during the back porch interval following each horizontal synchronizing pulse. The bursts are separated from the rest of the video signal by appropriate keying circuits and are used to control the local color subcarrier signal source for proper synchronous detection operation in the color television receiver.

A pair of signals called the I and Q signals respectively which account for the acuity of the eye to certain colors, are formed from the color difference signals and are employed in the two-phase modulation technique. These I and Q signals, as will be described, are then recovered in the receiver and passed through appropriate matrix and inverter systems to yield a recovery of the original color information. It is evident, however, that regardless of what type of signal is used for transmission in the two-phase modulation technique, accurate phasing and synchronism is absolutely necessary. It therefore follows that accurate keying of the synchronizing burst information into circuits for producing synchronism is also an absolute necessity in any color television receiver yielding a good performance.

It is therefore an object of this invention to provide an improved keying circuit.

It is still another object of this invention to provide an improved burst keyer circuit for color television receiver.

It is yet another object of this invention to provide a keyer tube which yields positive cutoff of a keyed amplifier circuit during a prescribed interval.

It is yet another object of this invention to provide a synchronizing burst keying circuit which effectively turns a burst amplifier on and off for a prescribed interval without introducing phase modulation into the synchronizing burst.

According to this invention, a kickback pulse is applied through a differentiating circuit to the control grid of a keyer tube. The differentiated kickback pulse is in time coincidence with the burst interval. A resistor is placed between the control grid and the cathode of this keyer tube and the direction of the keying pulse applied to the control grid is such that during the keying pulse, the keyer tube is cut off. In between keying pulses, the keyer tube conducts with its grid substantially at the potential of the cathode. A resistive load is introduced into the anode circuit of the keyer tube and the change of potential between the anode and the cathode of the keyer tube as the tube changes from conducting to nonconducting is used to introduce a keying bias pulse to the control grid of a burst amplifier tube so that the burst amplifier tube turns sharply on during the prescribed burst interval and completely off between the burst intervals. The circuit includes self-biasing means, which are responsive to both the kickback pulse and the burst keyer tube, for producing a bias voltage in the cathode circuits of both the keyer tube and the burst amplifier tube.

Other and incidental objects of this invention will become apparent from a reading of the following specification and an inspection of the accompanying drawing in which.

Figure 5:
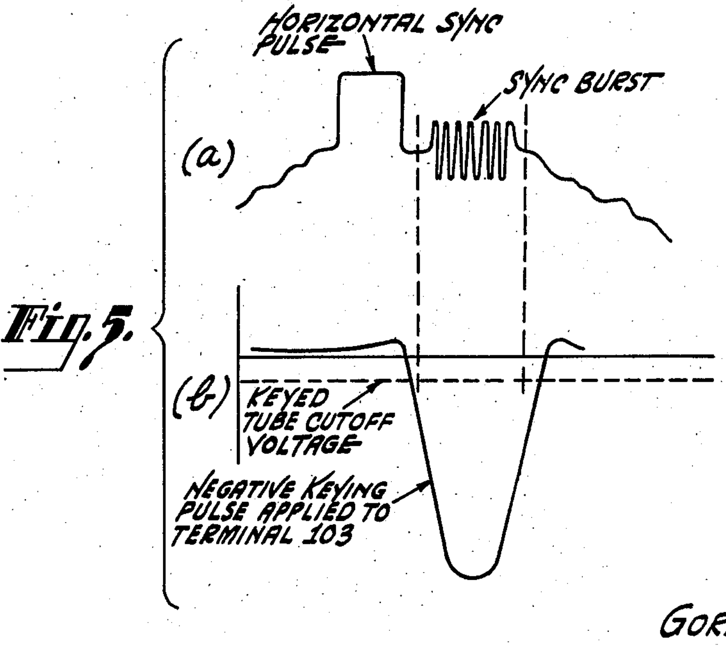

Figure 5*a* shows the horizontal synchronizing pulse and the synchronizing burst as included in the NTSC television signal; and Figure 5*b* shows the type of keying pulse which must be applied to a keyer circuit to open a burst amplifier only during the duration of the synchronizing burst.

The present invention is an important improvement in keying circuits which may be applied to the synchronizing circuits of a color television receiver. However, it is important to recognize that the present invention is also applicable to other circuits than those used in color television receivers. In many communication systems such as those employed in radar and in computers, it is also necessary to have a keying method which can turn amplifiers sharply on and off. It is also essential that the nature of the keying circuit be such that the keyer tube can operate at heavy duty. The present invention satisfies these requirements being positive in its action, capable of operating efficiently under heavy load and at high voltages and capable of producing a keyer voltage which may be utilized to control a multiplicity of circuits which are useful in the communication art.

Figure 1:
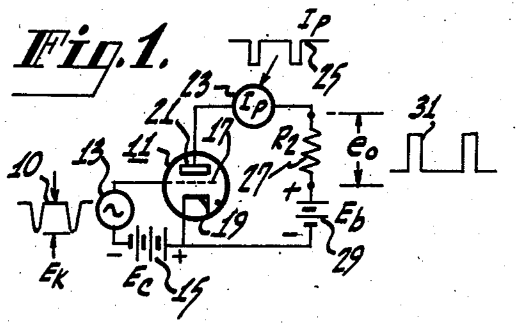
Figure 1 shows a basic vacuum tube circuit which has a resistive load.

Before turning to the present invention and its application to color television receiver systems, it is instructive to consider first the elementary operation of a vacuum tube which is resistive loaded and between whose grid and cathode are impressed negative pulses of great magnitude. Such a circuit is shown in Figure 1, where a series of negative pulses 10 having a maximum amplitude $E_k$ is applied by the generator 13 to the grid 17, this grid being subjected to the D.-C. bias $E_c$. The anode 21 is connected through the ammeter 23 to the resistive load 27, which is in series with the plate potential battery 29, whose negative terminal is connected to the cathode 19.

Figure 2:
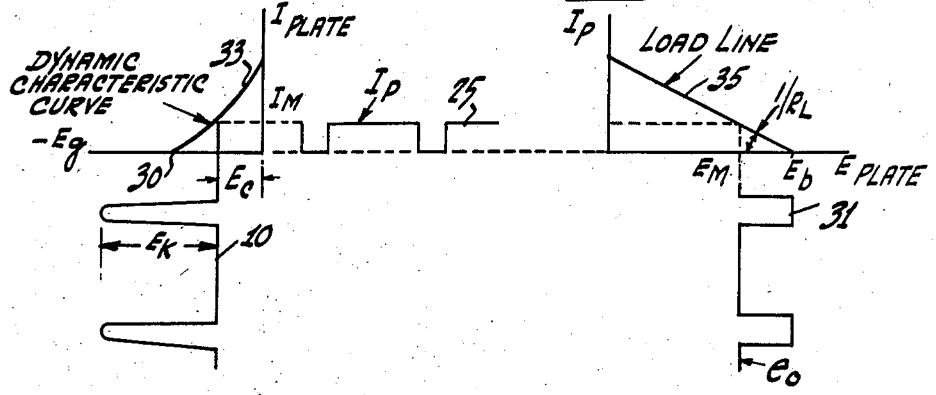
Figure 2 shows graphically the basic concepts applied to the circuit of Figure 1 for the case where large negative pulses are applied between the grid and the cathode.

Consider the operation of the circuit in Figure 1 with regard to the behavior of the overall circuit in response to the recurring negative pulses 10. Figure 2 shows the dynamic characteristic curve 33, which is dependent upon the load line 35 whose slope is reciprocal of the magnitude of the resistive load 27. The dynamic characteristic curve relates the grid voltage and the plate current, whereas the load line is a line which is related primarily to the plate current and the plate voltage though, as is well known, the precise values of plate current along the load line are dependent upon the voltage which is applied to the grid (this grid voltage information is implicitly contained in the dynamic characteristic curve 33). It is evident from Figure 2 that the large negative pulses delivered by the waveform 10 will drive the tube circuit beyond cutoff 30, so that the plate current 25 will be a series of steps as shown with the current existing from a maximum value $I_m$ to zero—the zero value existing during the duration of the pulse when the tube is driven beyond cutoff. Since the precise value of the plate voltage will be dependent upon the potential of both the battery and the voltage difference which is built up by the plate current across the plate resistance 27, the plate potential will therefore fluctuate between the value $E_M$ and $E_B$, $E_B$ being the voltage of the battery 29. It is evident from Figure 2 that the plate potential will be a series of pulses with sharp crests and rising and trailing edges. It therefore follows from the preceding discussion that one way of accomplishing the sharply changing values of anode potential is to drive the tube beyond cutoff over some prescribed interval; this then produces a potential between the anode 21 and the cathode 19 which is utilized for keying action in the present invention.

Figures 3, 4:
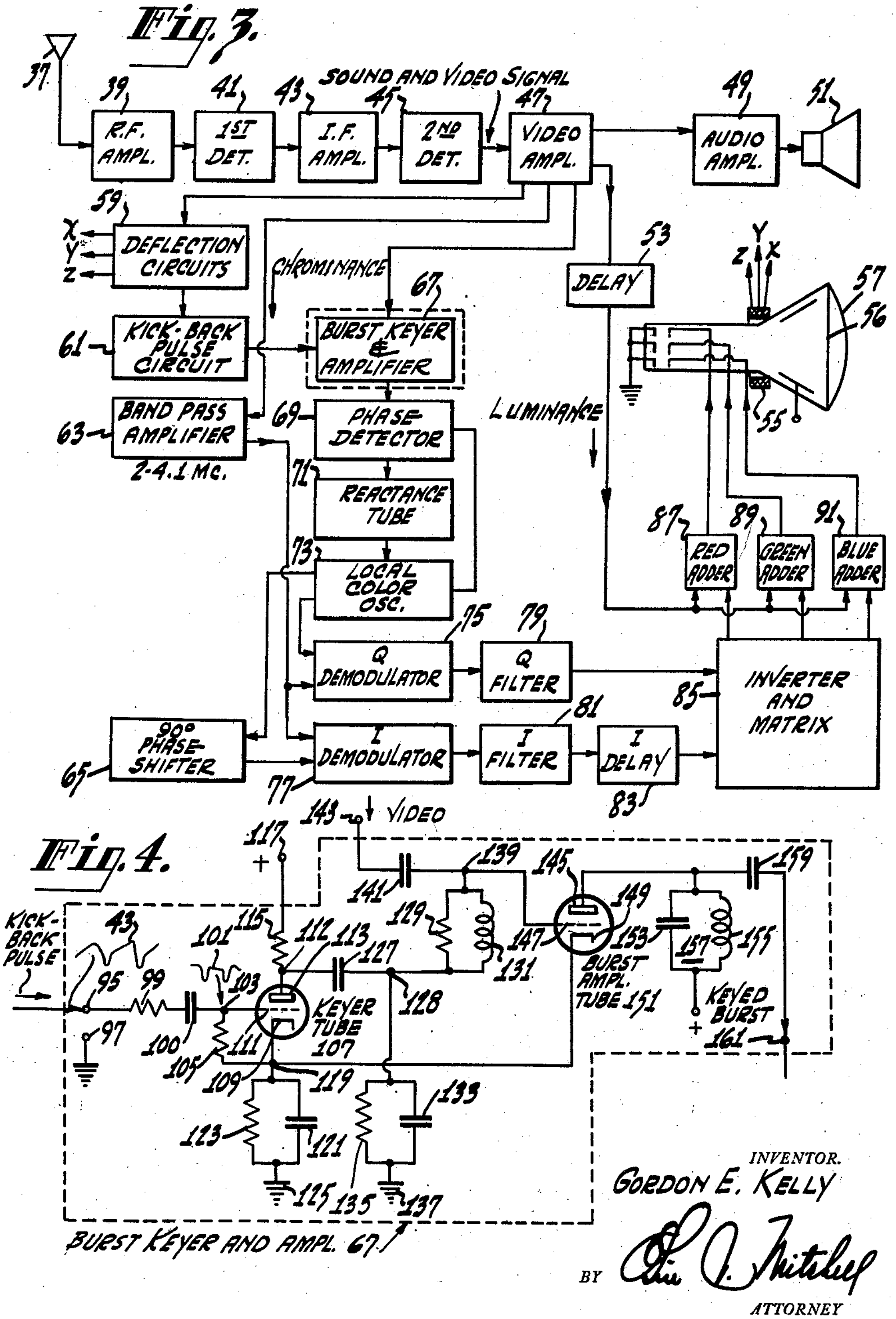
Figure 3 shows a block diagram of a modern color television receiver.
Figure 4 shows by circuit diagram a burst keyer and amplifier circuit which illustrates one form of the present invention.

Turning now to considerations of the modern color television receiver, it is instructive to study the block diagram shown in Figure 3. Here the transmitted signal from the television transmitter is applied to the R. F. amplifier 39. The resulting signal is then applied to the first detector 41 where heterodyning of the incoming signal is produced with the resultant intermediate frequency signal applied through the I. F. amplifier 43 and impressed on the second detector 45. The recovered video signal, which contains the sound information, is applied to the video amplifier 47. Several functions are required by the video amplifier 47 for the correct utilization of the video and sound information. First, using the well known principle of intercarrier sound, the sound information is separated from the overall sound plus video information and is sent through the audio amplifier 49 to the loud speaker 51. Secondly, the luminance signal is applied through the delay line 53 to the red adder 87, the green adder 89, and the blue adder 91 where it will be recombined with the proper color difference signals as produced by the color circuits of the color television receiver, the resulting component blue, green, and red signals being applied to suitable control grids of the color kinescope 57.

In addition, the video amplifier supplies the video information to the deflection circuits 59 where suitable control of the horizontal and vertical scanning systems is achieved to drive the deflection yokes 55. It is well known in the art that it is possible to acquire from the deflection circuits a kickback pulse. The circuit for producing the kickback pulse is included in the present block diagram circuit in the form of the kickback pulse circuit 61. In practical systems the kickback pulse is usually acquired from the step-up transformer, which is usually utilized to produce the high voltage which is necessary for driving the color kinescope.

It is necessary to produce a local color subcarrier signal which is properly synchronized with the transmitter so that synchronous detection can take place. Therefore the video information issues forth from the video amplifier to the burst keyer and amplifier 67. By proper use of a kickback pulse from the kickback pulse circuit 61, the synchronizing burst is separated from the video signal in the burst keyer and amplifier 67 and applied to the phase detector 69. Simultaneously, a local color oscillator 73 produces a local oscillator signal. This local color oscillator 73 impresses a portion of its signal into the phase detector 69. Should there be a difference in phase and frequency between the local oscillator signal and the synchronizing burst, the phase detector will produce an error voltage which is applied to the reactance tube 71, which is in turn utilized to control the local oscillator 73 and return its phase and frequency to that prescribed by the synchronizing burst.

The chrominance signal is applied to a band pass amplifier 63, which has a bandwidth roughly between 2 and 4.1 mc., this bandwidth being useful for separating the chrominance information from the luminance information. The output of the band pass amplifier is then simultaneously impressed on the Q demodulator 75 and the I demodulator 77. To produce the synchronous detector action, the output of the local color oscillator is then applied also to the Q demodulator 75 and through the 90° phase shifter 65 to the I demodulator 77. The I and Q signals then issue forth from their respective demodulators with the Q signal filtered by the Q filter 79, which is a low pass filter having an upper cutoff frequency in the vicinity of ½ mc. The I filter is a filter of special characteristics; the I signal is basically a signal having double sideband information for components below ½ mc. and single sideband information for components between ½ mc. and 1½ mc. Therefore the pass band characteristic of the I filter is such that in some receivers the gain of the filter increases the amplitudes of those signals in the range between ½ mc. and 1½ mc. to a level whereby the spectrum energy corresponding to that lost because of the employment of the single sideband method of transmission is restored; in other receivers, the gain is uniform from 0 to 1.5 mc. The I signal is then passed through the I delay network 83 so that the time delay of the Q circuit and the I circuit may be properly matched with that of the luminance circuit. The I and Q signals are then applied to the inverter-matrix circuit 85. The inverter-matrix circuit 85 then supplies a red color difference signal to the red adder 87, a green color difference signal to the green adder 89, and a blue color difference signal to the blue adder 91. In these respective adders, the component signals are formed, which are applied to the appropriate control grids of the tri-color kinescope 57, on whose face 56 the transmitted color picture is reproduced.

Figure 4 shows one embodiment of the present invention. Here the kickback pulse is applied to the terminal 95; this kickback pulse has negative polarity and an amplitude of substantially 40 volts peak-to-peak. The kickback pulse is passed through the differentiating circuit consisting of the resistors 99 and 105 and the condenser 100 which then applies the differentiated kickback pulse to the grid terminal 103. The resistor 105 is connected between the grid 111 and the cathode 109 as shown. During the time between kickback pulses the grid is at substantially the potential of the cathode and the keyer tube 107 conducts heavily. However, when the differentiated kickback pulse is applied to the grid 111, it is of sufficient magnitude to drive the keyer tube 107 beyond cutoff during this time. In accordance with the principle described in connection with Figures 1 and 2, the potential between the anode terminal 112 and the cathode terminal 119 will rise sharply and maintain a flat and steady crest for the duration of the kickback pulse, to an extent dependent upon the magnitude of the plate resistance 115. The differentiated kickback pulse and the tube current during the period between pulses are also useful for establishing a D.-C. bias voltage across an RC network consisting of the condenser 121 in parallel with the resistor 123; this RC network is connected between the cathode terminal point 119 and the ground connection 125.

Consider now the function of the burst amplifier tube 151 which is connected to the keyer tube cathode terminal 119. The keyer tube anode terminal 112 is then connected through the coupling condenser 127 to the terminal point 128 which is a mid-terminal for the grid network connected between the grid 147 of the burst amplifier tube 151 and the ground connection 137. This grid network consists of the inductance 131 and the resistor 129 connected between the grid 147 and the mid-terminal point 128. A video signal applied to the terminal 143 can pass through the condenser 141 and will be developed across this inductance 131 and resistor 129. At the same time a condenser 133, which by-passes the burst but not the keying pulse and which is in parallel with a resistor 135, is connected between the mid-terminal point 128 and the ground point 137. This parallel RC circuit is useful in providing a D.-C. bias and ground potential for the grid 147 of the burst amplifier tube 151.

Connected to the anode 145 of the burst amplifier tube 151 is the resonant circuit 157, which is tuned to the burst frequency so that should the burst amplifier tube be opened during the burst interval, the synchronizing burst which is contained in the video signal will then appear across this burst frequency resonator 157. The keyed burst is then passed through the by-pass condenser 159 to the terminal 161 from which point it may be impressed into the phase detector 69. As has been mentioned, at pulse time the keyer tube 107 is completely cut off, providing a flat top pulse voltage at the plate of the tube. The cathode is biased such that an average positive D.-C. voltage results depending on the tube current at zero bias, and the value of the time constant of the RC circuit composed of the condenser 121 and the resistance 123. The potential change at the anode potential 112 is also dependent upon the maximum current, the value of the plate resistance 115 and the resistor 135.

By connecting the keyer tube anode to the low side of the coil 131, the keying potential delivered there is practically the same as that which reaches the grid 147 for pulse frequencies. The burst amplifier tube 151 is cut off during the period between pulses and turned on during pulse time. The grid-to-cathode bias of the burst amplifier tube 151 during pulse time is determined primarily by the choice of the resistors 115, 123 and 135, which maintain a constant value of bias over wide limits of the keyer tube current. Since the deflection pulse may vary in time by at least a microsecond with respect to the horizontal hold control of the color television receiver, the pulse must be wide enough to key all of the burst over this range. The leading edge is therefore determined by the standard of the retrace which is approximately the middle of the horizontal synchronizing pulse and the width may be controlled by condenser 100—an increase in the capacitance of the condenser 100 causing an increase in pulse width.

Since a phase error exists on the first few cycles and an opposite phase error on the last few cycles of the burst due to the lack of the high frequency sideband, it is desirable to key on all cycles of the synchronizing burst with equal amplitude so as to introduce no phase shift which may be afforded by variations of the kickback pulse and by variations of the pulse timing.

The pulse load resistor 135 is by-passed by the condenser 133 to an extent just enough to provide a low impedance for the 3.58 mc. subcarrier frequency and hence has little effect on the burst input circuit.

The embodiment used to describe the present invention has shown the keyer tube signal from the keyer tube 107 and the video signal applied to one control grid 147 of the burst amplifier tube 151. This embodiment has been employed inasmuch as it is simple and direct and because excellent results have been achieved with it. However, it is possible to apply the keyer signal from the keyer tube 107 to the control grid 147 of the burst amplifier tube 151 and the video signal to another grid of the burst amplifier tube 151, such a grid possibly being the suppressor grid should the tube used be a pentode. It also follows that if a pentode is used for the burst amplifier tube, it is possible to apply the keyer tube signal from the keyer tube 107 to either the screen grid or the suppressor grid, of the burst amplifier tube with the video signal impressed on the control grid.

Having described the invention, what is claimed is:

1. A keying circuit for controlling a color television burst amplifier in a color television receiver of the type employing a video signal in which the color synchronizing burst is located on the back porch of the horizontal synchronizing pulse, said keying circuit comprising in combination, a source of kickback pulses having an output terminal, a differentiating circuit coupled to said output terminal of said source of kickback pulses to yield a source of negatively directed pulses of duration and time-coincidence substantially that of said color synchronizing burst, a keying tube having an anode, a cathode, and at least a control grid, a potential source, a load impedance, means for coupling said differentiating circuit to the control grid of said keying tube, means for coupling said potential source and said load impedance between the anode and cathode of said keying tube to develop in response to said differentiated kickback pulses an anode-to-cathode potential waveform of prescribed form and duration across said keying tube, a burst amplifier tube having an anode, a cathode, and at least a control grid, a burst responsive resonant circuit coupled to the anode of said burst amplifier, means for utilizing said anode to cathode potential waveform at the control grid of said burst amplifier to render said burst amplifier conducting during substantially the duration of said color synchronizing burst, means for coupling said video signal to the control grid of said burst amplifier tube, and means for utilizing the burst signal appearing across said burst responsive resonant circuit for color synchronization in said color television receiver.

2. A keying circuit for controlling a color television burst amplifier in a color television receiver of the type employing a video signal in which the color synchronizing burst is located on the back porch of the horizontal synchronizing pulse, said keying circuit comprising in combination, a source of kickback pulses having an output terminal, a kickback pulse shaping network coupled to said output terminal of said source of kickback pulses to yield a source of negatively directed pulses of duration and time-coincidence slightly greater than that of said color synchronizing burst, a keying tube having an anode, a cathode, and at least a control grid, a potential source, a load impedance, means for coupling said kickback pulse shaping circuit to the control grid of said keying tube, means for coupling said potential source and said load impedance between the anode and cathode of said keying tube to turn off said keying tube during substantially the duration of said negatively directed pulse to develop an anode-to-cathode potential waveform of flat-topped pulses of positive potential across said keying tube, said anode-to-cathode potential waveform being responsive to the output of said kickback pulse shaping network, a burst amplifier tube having an anode, a cathode, and at least a control grid, a burst responsive resonant circuit coupled to the anode of said burst amplifier, means for utilizing said anode-to-cathode potential waveform at the control grid to render said burst amplifier conducting during substantially the duration of said color synchronizing burst, means for coupling said video signal to the control grid of said burst amplifier tube, and means for utilizing the burst signal appearing across said burst responsive resonant circuit for color synchronization in said color television receiver.

3. The invention as set forth in claim 2 and wherein is included a biasing means responsive to the output of said differentiating circuit and also coupled to the control grid of said burst amplifier tube to establish suitable bias potentials for rendering said burst amplifier tube conducting for a prescribed duration interval dependent upon said differentiating circuit.

4. A keying circuit for controlling a color television burst amplifier in a color television receiver of the type employing a video signal in which the color synchronizing burst is located on the back porch of the horizontal synchronizing pulse, said keying circuit comprising in combination, a source of kickback pulses having an output terminal, a kickback pulse shaping network coupled to said output terminal of said source of kickback pulses to develop a series of negatively directed pulses of duration and time-coincidence slightly greater than that of said color synchronizing burst, a keying tube having an anode, a cathode, and at least a control grid, a potential source, a load impedance, means for coupling said kickback pulse shaping circuit to the control grid of said keying tube, means for coupling said potential source and said load impedance between the anode and cathode of said keying tube to develop pulses of positive potential at the anode of said keying tube, a burst amplifier device having a controllable electron flow to an anode, a burst responsive resonant circuit coupled to the anode of said burst amplifier tube, means for applying said pulses of positive potential from the anode of said keying tube to said control grid of said burst amplifier tube to cause electron flow in said burst amplifier tube only during the duration of said color synchronizing burst, means for introducing modulations representative of said video signal into said electron flow of said burst amplifier tube during said pulses of positive potential to produce said color synchronizing bursts across said resonant circuit, and means for utilizing the burst signal appearing across said resonant circuit for color synchronization in said color television receiver.

5. A keying circuit for a color synchronizing burst amplifier in a color television receiver for receiving a video signal in which a color synchronizing burst is located on the back porch of the horizontal synchronizing pulse, said keying circuit comprising in combination, a source of kickback pulses, a differentiating circuit having adjustable electron storage properties, means coupling said differentiating circuit to said source of kickback pulses to produce negatively directed pulses of duration and time-coincidence substantially that of said color synchronizing burst to a degree controlled by the adjustment of said differentiating circuit, a keying tube having an anode, a cathode, and a control grid, means for coupling the differentiated kickback pulses from said differentiating circuit to the control grid of said keying tube, a first resistor, means for connecting said first resistor between the control grid and the cathode of said keyer tube for rendering said keyer tube nonconducting during the duration of said negatively directed pulses and conducting between said negatively directed pulses, a second resistor, a first potential source having a positive and a negative terminal, means for connecting said second resistor between said first potential source positive terminal and the anode of said keying tube thereby developing an anode-to-cathode potential waveform which is a series of flat-topped pulses of positive potential, the flat top quality of said flat-topped pulses caused by said keyer tube being nonconducting during said flat-topped pulses, a fixed potential terminal, means for connecting the negative terminal of said first potential source to said fixed potential terminal, an amplifier tube having an anode, a cathode, and at least a control grid, a first biasing means connected between said fixed potential terminal and the cathode of said keying tube, means coupling said first biasing means to said differentiating circuit and responsive to said differentiating circuit, a second biasing means, and an input impedance network connected serially between the control grid of said amplifier tube and said fixed potential terminal with said second biasing means on the fixed potential terminal end of said serially connected network, by-pass means, means utilizing said by-pass means for coupling the anode of said switching tube to the midpoint of said serially connected network comprised of said second biasing means and said input impedance network, means for coupling the cathode of said keying tube to the cathode of said amplifier tube, a burst responsive resonant circuit, a second potential source having a positive potential terminal and a negative potential terminal, means for connecting the negative terminal of said second potential source to said fixed potential terminal, means for coupling said burst responsive resonant circuit between the anode of said amplifier tube and the positive terminal of said second potential source, means for adjusting said first potential source and said second potential source whereby the action of stopping the flow of electrons in said keying tube combined with the action of said second biasing means results in said amplifier tube conducting during substantially the interval of the burst, means for coupling said video signal to the control grid of said amplifier tube, and means for utilizing the burst signal appearing at said burst responsive resonant circuit for color synchronization in said color television receiver.

6. The invention as set forth in claim 5 and wherein said amplifier tube has more than one control grid, means for coupling said video signal to one of said control grids and means for coupling said keying tube and said second biasing means respectively to another of said control grids.

7. A keying circuit for controlling a color television burst amplifier in a color television receiver of the type employing a video signal in which a color synchronizing burst is located on the back porch of each horizontal synchronizing pulse, said keying circuit comprising in combination, a source of kickback pulses having an output terminal, a kickback pulse shaping network coupled to said output terminal to develop negatively directed pulses of time duration slightly greater than that of said color synchronizing bursts and in time coincidence with said bursts, a keying tube having an anode, a cathode, and at least a control grid, a ground terminal, a positive potential source coupled to said ground terminal and providing a positive potential with respect to said ground terminal, a load impedance, means for coupling said kickback pulse shaping circuit to the control grid of said keying tube, means for coupling said load impedance between the anode of said keying tube and said positive potential source, means to couple said cathode of said keying tube to said ground terminal, said negatively directed pulse being thereby caused to bias said keying tube beyond cutoff during that pulse and therefrom to develop at said anode a pulse having a peak of positive potential with respect to the potential of said ground terminal, said positive potential pulse occurring during a predetermined portion of said negatively directed pulse, a burst amplifier tube having an anode, cathode, and a control grid, a burst-responsive resonant circuit coupled to the anode of said burst amplifier, circuit means coupled to said anode of said keying tube and responsive to said video signals to apply both said positive potential pulse and said video signals between the control grid and the cathode of said burst amplifier tube, and potential means coupled to said burst-responsive resonant circuit and to said ground terminal whereby said color synchronizing bursts is caused to be developed across said burst-responsive resonant circuit during said positive potential pulse.

References Cited in the file of this patent

UNITED STATES PATENTS

| | | |
|---|---|---|
| 2,535,247 | White | Dec. 26, 1950 |
| 2,586,957 | Keizer | Feb. 26, 1952 |
| 2,594,380 | Barton | Apr. 29, 1952 |
| 2,653,187 | Luck | Sept. 22, 1953 |
| 2,713,608 | Sonnenfeldt | July 19, 1955 |